Patented Mar. 13, 1928.

1,662,489

UNITED STATES PATENT OFFICE.

HARRY WILLIAMS CHARLTON, OF NEW YORK, N. Y., ASSIGNOR TO AMERICAN CYANAMID COMPANY, OF NEW YORK, N. Y., A CORPORATION OF MAINE.

PHOSPHORUS MATERIAL.

No Drawing. Application filed August 2, 1923. Serial No. 655,209.

This invention relates to a method of forming phosphates and other compounds of phosphorus in a manner that is simple and effective, and radically different from those usually employed. It relates to a process of producing a large number of compounds both organic and inorganic.

The object of the invention is to utilize an intermediate product in the manufacture of phosphoric acid, and thus eliminate an expensive and complicated step, and to induce a union of the acid radical with the desired material without waiting to form the acid itself. With these and other objects in view, the invention consists in the various steps and combination of steps constituting the process, and in the new product all as will be more fully hereinafter described and particularly pointed out in the claims.

As an illustration of the invention I mix 30 parts by weight of phosphoric anhydride with 32 parts by weight of tricalcic phosphate and allow the mass to react in presence of the slight amount of moisture that is usually present in the air. In the above case the mass in a short time is pasty, and then dries. It is found that it becomes entirely water soluble and reacts in a manner similar to acid phosphate only the percentage of moisture is much less.

I have discovered that phosphoric anhydride has a most peculiar property of entering into combination with oxides and various salts in presence of minute quantities of water. This reaction is not clearly understood, but I imagine a minute amount of water enables the reaction to be completed in one portion, and the water liberated brings about a similar reaction in another portion. It is thus a progressive chemical action. As the heat of hydration of phosphoric anhydride is very great, a reaction of this type is not impossible, and anhydrous salts result in many cases.

There are a number of methods of modifying and changing this reaction, both as regards speeding it up and retarding it. There is almost invariably a difference in physical appearance when an oxide or an organic material is used.

If the phosphoric anhydride and the phosphate are mixed and the whole subjected to the action of a limited amount of steam, the reaction is very rapid and the drying takes place in a very short time. This procedure is advisable when the material under treatment is refractory. Another method of treatment, which also shortens up the drying period consists in mixing the phosphoric anhydride with the material and allowing it to stand for a short time till it becomes plastic, and then warming it to a temperature in the region of 100 degrees centigrade.

I have discovered a very peculiar property in connection with this reaction. It is well known that when phosphoric anhydride unites with water metaphosphoric acid results, and on boiling this with a considerable excess of water, pyrophosphoric acid is produced, and on further boiling orthophosphoric acid is formed. It would naturally be inferred that when phosphoric anhydride reacts with phosphate rock in the presence of a trace of water, that a metaphosphate would be produced. As an actual fact it is found that the orthophosphates are produced in this case.

Although in nearly every instance the material resulting from the mixture of phosphoric anhydride with an organic or inorganic material becomes pasty, it must not be inferred that this pastiness is the result solely of the absorption of moisture, although in many cases it is partially due to this. A very good illustration of this physical change is found when crude anhydrous calcium cyanamid and phosphorus pentoxide are mixed in equal proportions. The mass becomes pasty almost immediately and there is a decided rise in temperature. When treating this material it has been found advisable to allow the pasty mass to stand exposed to the air for a couple of days and then the drying action will automatically set in.

If but a small amount of phosphoric anhydride is added to calcium cyanamid, such as say 20%, the pastiness is not apparent, and the only physical change is the complete suppression of dust.

Although in the above illustrations I have referred more particularly to phosphorus pentoxide, as free from combined moisture as this hydroscopic material can be manufactured on a commercial scale. I do not wish to be limited to anhydrous or nearly anhydrous material. I have found that any form of phosphoric anhydride carrying moisture up to molecule for molecule, may be employed. In case the phosphoric anhydride is extremely wet the mixing troubles are increased. It is also a fact that the strength and force of the reaction is materially lessened as the percentage of water in the anhydride increases.

Probably the great force that is noticeable in the reaction which I have described and claimed, is at least partially due to what might be stated as the reactivity of phosphoric acid acting in the nascent state. In other words the intimately mixed phosphate rock, calcium cyanamid, etc., are in close contact and the absorption of an infinitesimally small amount of moisture causes the formation of an infinitesimally small amount of phosphoric acid, and this in its nascent state reacts with the phosphate rock, and the liberated moisture passes on and is again used. On the other hand it is not impossible that the phosphoric anhydride may have the power of attacking and combining with the solid tricalcic phosphate, etc., without external agents. This view is somewhat strengthened by the fact that the phosphoric anhydride is able to react with many organic compounds in cases where the presence of water would scarcely be considered as an assistance.

This discovery makes possible the application of phosphorus pentoxide in carrying out many processes, and is in itself made possible by the application of the methods of electrical precipitation usually known as the Cottrell process, to the phosphoric anhydride vapor produced usually in an electric furnace. By this method a cheap product is assured.

There are many illustrations that might be given of the activity of phosphorus pentoxide, in contact with organic materials but a simple fertilizer case will suffice. If calcium cyanamid in the form of a thin paste is treated with carbon dioxide, and a major portion of the lime removed, and the material in solution recovered by evaporation, it is found that on mixing with phosphoric anhydride and allowing to cure and dry, a soluble dry and valuable fertilizer material containing urea results.

As any one skilled in the art may vary the nature of the reaction, the sequence of the steps going to make up the process, and the nature of the product without departing from the spirit of the invention. I do not wish to be limited to the above disclosures except as may be required by the claims.

I claim:—

1. A method of producing compounds of phosphorus which comprises mixing phosphoric anhydride, and calcium cyanamid; substantially as described.

2. A method of producing compounds of phosphorus associated with compounds of nitrogen which comprises mixing phosphorus pentoxide carrying less than one molecule of water of combination, and unoiled and unhydrated calcium cyanamid; substantially as described.

3. A method of producing compounds of phosphorus which comprises mixing in equal proportions phosphoric anhydride and crude calcium cyanamid, and after allowing to cure for a couple of days, gently warming at a temperature in the region of 110° C., and thereby forming a dry granular mass; substantially as described.

HARRY WILLIAMS CHARLTON.